April 25, 1967     A. GIACOMETTI     3,316,053
DIFFUSE REFLECTION OBSERVATION PROJECTION SCREEN
Filed Sept. 25, 1964

Adelmo Giacometti
INVENTOR
BY
Agent

United States Patent Office 3,316,053
Patented Apr. 25, 1967

3,316,053
DIFFUSE REFLECTION OBSERVATION
PROJECTION SCREEN
Adelmo Giacometti, Via XXII Marzo 22,
Milan, Italy
Filed Sept. 25, 1964, Ser. No. 399,962
Claims priority, application Italy, Oct. 3, 1963,
20,359/63, Patent 706,208
3 Claims. (Cl. 352—86)

This invention relates to a projection screen of the diffuse reflection observation type and more particularly it concerns a projection screen of this type improving the relief sensation of reflected images in general and the stereoscopic effect of stereoscopic projections in particular.

It is well known that the sunlight and optic spectrum is formed of fundamental colors having a different reflecting wave length. Such colors, as well known, are in order: red, orange, yellow, green, blue, indigo and violet, and their wave length measured in Angstrom units varies in such order between 7000 and 4000 A.

It is the object of this invention to exploit the abovementioned properties for a projection screen of the diffuse reflection observation type suitable to improve the relief sensation of reflected images in general and the stereoscopic effect of stereoscopic images in particular.

It is another object of this invention to attain the preceding object by providing a projection screen exploiting the aforesaid properties through a particularly simple structure of easy execution and efficient stereoscopic or relief sensation of reflected images and having a relatively convenient making cost, particularly for cinematographic motion-picture or other projections.

These and still other objects are attained by the projection screen of the diffuse reflection observation type according to this invention, which is characterized in that it is constituted of a reflection surface having colored strips defining the said reflection surface and means adapted to cause a continuous motion of said surface perpendicular to said colored strips thereof and tangentially to said reflection surface and at such a speed as to obtain the visual perception of an uniform surface of an even color preferably tending towards a white color, so that an improved optical stereoscopic perception of reflected stereoscopic images is obtained.

This relief sensation and improved stereoscopic effect is believed to be a consequence of the different reflecting wave lengths of the colors of the projection screen according to the invention.

In practice it has been found that such a projection screen causes a marked relief sensation of reflected images of the so called black and white and colored projections and a considerably improved stereoscopic effect of reflected images of the so called stereoscopic projections.

Further characteristic features and advantages of the invention will become more apparent from the following detailed description of a preferred non-limiting embodiment of a projection screen according to this invention taken in conjunction with the accompanying drawing in which.

Figure 1:
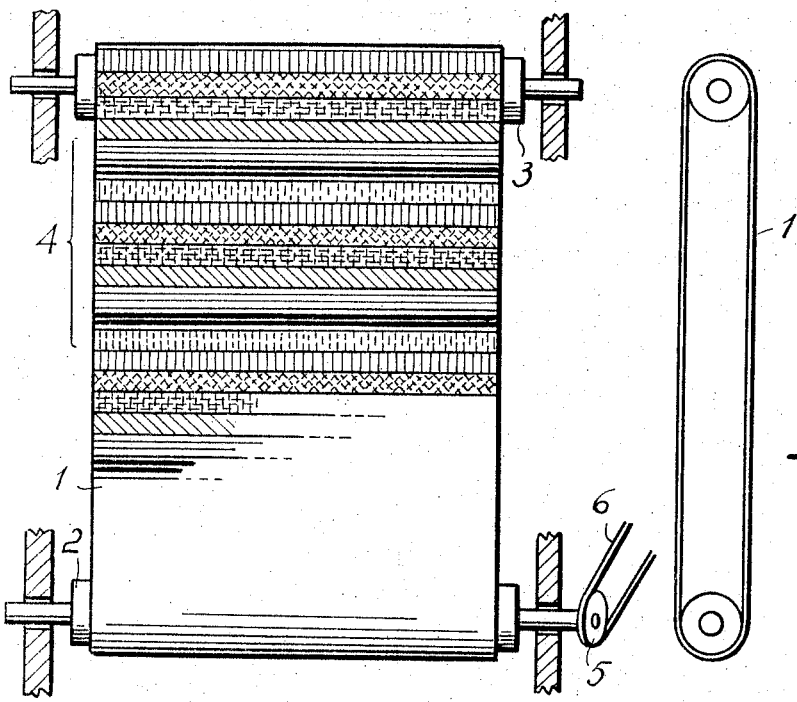
FIG. 1 represents such a projection screen in a diagrammatical front elevation.
Figure 2:
FIG. 2 represents the same projection screen in a diagrammatical side view.
Figure 3:
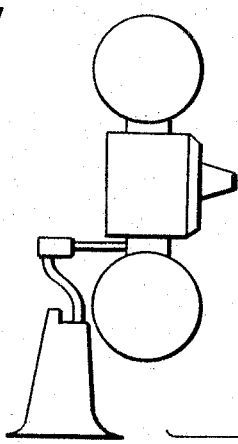
FIG. 3 shows diagrammatically a motion picture projector facing the projection screen.

Referring now to the above figures, it will be seen that the projection screen given by way of example comprises a flexible screen member 1 wound according to an endless ring arrangement over the horizontal driving and guiding rollers 2, 3. Said member 1 has a surface with such visible colored strips 4 that by moving said member 1 around the rollers 2, 3 at adequate speed in a perpendicular direction to the sense in which said colored strips 4 extend, for example by actuating the roller 2 through a pulley 5 and belt transmission 6 by a motor (not shown) one obtains the visual perception of an uniform surface nearing the white color. So for example by providing the colored strips 4 in the basic colors of the optic spectrum, namely red, orange, yellow, green, blue, indigo and violet, due to the different reflecting wave length of such colors varying, as well known, in the order between 7000 and 4000 A., respectively, one obtains in practice the optical perception of reflected images with an improved stereoscopic or relief effect. With regard to the width of colored strips, this may vary depending upon the number of colors used and speed at which the projection surface uniformity is obtained, e.g. this may also be of approximately 2 cm.

The movement of the screen member 1 should preferably follow a path which is substantially rigid and uniform at the projection zone, namely without possibility of oscillation or visible vibrations at said zone of member 1.

For these purposes further guide means (not shown) may be provided between rollers 2 and 3, such as additional loose rollers or other equivalent rolling or sliding means. Advantageously a tensioning device (not shown) may be provided for imparting the required tension to the screen. Such tensioning device may be provided on the supports of at least one of the rollers 2 or 3, which supports may be swingable with the tendency to increase the distance between the rollers 2 and 3. This action may be obtained in known manner with spring means or counterweight members.

The speed of the screen depends on the width of the colored strip and should in any case be at least as high as to cause a frequency which is greater than the so called "time lag" of the eye.

Using rollers 2 and 3 of about 5 cm. diameter, very good results have been obtained with 800–1000 r.p.m. using only fundamental colors. It is obvious that the speed of the screen may be still higher. In practice the upper limit depends only on constructive features and the increase of vibrations which may occur at high speeds.

Besides the fundamental colors also other colors may be used with the same effect.

In practice the material of the screen used and of the colors may be of any kind and the invention is not limited by such materials.

The tests carried out have been made with a screen made of a plastic laminated fabric or cloth known under the trademark name "Resinflex," while the colors used were wax pastels.

The colors may be either opaque or brilliant.

It will be obvious that instead of an endless ring arrangement screen as above described a rotating disc arrangement may be provided, with radially extending colored strips and with a peripherical part of the disc used as a projection screen.

With a projection screen and an arrangement of parts provided as above it has been found that a marked relief sensation, when viewing reflected images of the so called black and white and colored projections may be practically attained and a considerably improved stereoscopic effect of the so called stereoscopic projections.

While I have shown and described specific embodiments of my invention, it will be readily apparent that many changes of structure and operation could be made without departing from the spirit of the invention as defined by the scope of the appended claims.

I claim:

1. The combination of a movable projection screen and a projector of images projecting images on said movable screen independently of the motion of said movable projection screen, the movable projection screen comprising, a reflection surface having a plurality of narrow substantially parallel and contiguous colored strips defining said surface and driving means for causing a continuous motion of said surface in a direction tangential to said surface and transverse to said colored strips said driving means imparting such a speed to said coloured strips as to obtain a visual perception of a substantially even colour reflecting with stereoscopic effect the images projected thereon.

2. A combination according to claim 1, wherein the screen is in the form of a flexible sheet member and two rollers are provided over which the flexible member is wound as an endless ring and wherein the colored strips extend substantially parallel to the rollers at least one of said rollers having transmission means for the connection with a motion source.

3. A combination according to claim 1, wherein said projector is a motion picture projector.

References Cited by the Examiner
UNITED STATES PATENTS

| | | | |
|---|---|---|---|
| 1,411,661 | 4/1922 | Hurd | 88—28.9 |
| 1,458,401 | 6/1923 | Flender. | |
| 1,824,446 | 9/1931 | Pearson | 352—66 |
| 2,689,879 | 9/1954 | Rehorn | 352—66 X |

JULIA E. COINER, *Primary Examiner.*